US006577996B1

(12) United States Patent
Jagadeesan

(10) Patent No.: US 6,577,996 B1
(45) Date of Patent: Jun. 10, 2003

(54) METHOD AND APPARATUS FOR OBJECTIVE SOUND QUALITY MEASUREMENT USING STATISTICAL AND TEMPORAL DISTRIBUTION PARAMETERS

(75) Inventor: Ramanathan T. Jagadeesan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/207,362

(22) Filed: Dec. 8, 1998

(51) Int. Cl.[7] .................................................. G10L 15/10
(52) U.S. Cl. ........................ 704/236; 704/239; 704/240
(58) Field of Search .............................. 704/200.1, 236, 704/240, 237, 238, 239

(56) References Cited

U.S. PATENT DOCUMENTS 6,477,492 B1 * 11/2002 Connor ........................ 704/236

* cited by examiner

*Primary Examiner*—Susan McFadden
(74) *Attorney, Agent, or Firm*—Marger Johnson & McCollom, PC

(57) ABSTRACT

A method and apparatus for objectively evaluating sound quality of a signal processor or transmission channel. The present invention analyzes the distortion in a series of test sound frames compared to a series of sample sound frames. The invention detects sequences of test sound frames having distortion levels that are greater than a temporal distortion threshold and calculates an average length and a maximum length of these sequences. The present invention also detects individual test sound frames having distortion levels that are greater than an outlier distortion threshold and calculates a percentage of these frames present in the series of test sound frames. Further, the present invention calculates the average distortion level in the series of test sound frames and a variance of the distortion level in the test sound frames. These parameters are then combined to produce a objective sound quality score which can be used to evaluate a sound transmission system or select a transmission channel for communication of sound signals.

22 Claims, 4 Drawing Sheets

METHOD AND APPARATUS FOR OBJECTIVE SOUND QUALITY MEASUREMENT USING STATISTICAL AND TEMPORAL DISTRIBUTION PARAMETERS

FIELD OF THE INVENTION

The present invention relates generally to speech quality measurement and, more particularly, to speech quality measurement of voice transmitted over a packet network.

BACKGROUND OF THE INVENTION

Perceived speech quality assessment has traditionally been performed using subjective testing, which involves considerable time, effort and resources. Subjective tests are carried out by having a number of listeners come in and listen to a set of speech files and rate them on a subjective scale. Objective speech quality metrics try to estimate the perceived speech quality by comparing the original and distorted speech signals.

Traditional objective measures such as Signal to Noise Ratio (SNR) do not provide a good estimate of subjective quality, especially when sophisticated low bit rate speech coding techniques are used. An auditory model can be used to perceptually weight the distortion between the original and the test signals, to compute the perceptually significant distortion.

Other methods using a perceptual model compute a weighted average of the frame based perceptually weighted distortion measure to compute the objective quality score. One such method is PSQM (Perceptual Speech Quality Measure) which is used in ITU-T standard P.861. This method uses a perceptual model to map the original and test speech signals onto a psychophysical representation to compute a "noise disturbance" for each frame of speech. The PSQM score is computed as a weighted average of the "noise disturbance" where silence frames and speech frames are given different weights. The "noise disturbance" of PSQM is an example of a frame based perceptual distortion.

A PSQM test system 100 is shown in FIG. 1. A sound source 10 generates a series of sound sample frames x[n] which are input to a signal processor 20. The signal processor 20 processes the sound sample frames x[n] and outputs a series of test or coded sound frames y[n]. The series of sound sample frames x[n] and the series of coded sound frames y[n] are then input to PSQM processor 30 which processes the two series and generates PSQM parameters which evaluate the quality of the coding performed by the signal processor 20.

FIG. 2 is a block diagram which describes the PSQM algorithm performed by the PSQM processor 30. Within PSQM, the physical signals constituting the source and test speech, x[n] and y[n] respectively, are mapped onto psychophysical representations that match the internal representations of the speech signals (i.e. the representations inside our heads) as closely as possible. These internal representations make use of the psychophysical equivalents of frequency (critical band rates) and intensity (Compressed Sone). Masking is modeled in a simple way: masking is taken into account only when two time-frequency components coincide in both the time and frequency domains.

Within the PSQM approach, the quality of the test speech is judged on the basis of differences in the internal representation. This difference is used to calculate the noise disturbance as a function of time and frequency. In PSQM, the average noise disturbance is directly related to the quality of test speech. The PSQM approach is discussed in detail in ITU Recommendation P.861 "Methods for Objective and Subjective Assessment of Quality".

SUMMARY OF THE INVENTION

A sound quality evaluation processor, according to the present invention, includes a comparator and a sequence processor. The comparator has first and second inputs and an output. The first input is configured to receive a sequence of sound sample frames and the second input is configured to receive a sequence of test sound frames. The comparator is configured to compare each frame of the sequence of test sound frames to a corresponding one of the sequence of sound sample frames in order to generate a sequence of distortion measure values at the output of the comparator. The sequence processor has first and second inputs and a first output. The first input is configured to receive the sequence of distortion measure values from the comparator and the second input is configured to receive a temporal outlier distortion threshold value. The sequence processor detects temporal-outlier sequences (TOSs) in the distortion measure values that are greater than the temporal outlier distortion threshold value. An average TOS length is then computed for output at the first output of the sequence processor.

The sound quality evaluation processor, according to the present invention, can also include an outlier processor having a first input configured to receive the sequence of distortion measure values from the comparator and a second input being configured to receive a perceptual outlier distortion threshold value. The outlier processor detects each perceptual outlier frame having a distortion measure value greater than the perceptual outlier distortion threshold value. The number of perceptual outlier frames is divided by the number of distortion measure values to obtain a percent of perceptual outliers output at the first output of the outlier processor.

The features and advantages of the invention will become more readily apparent from the following detailed description of a preferred embodiment of the invention which proceeds with reference to the accompanying drawings.

DETAILED DESCRIPTION OF THE INVENTION

Figure 3:
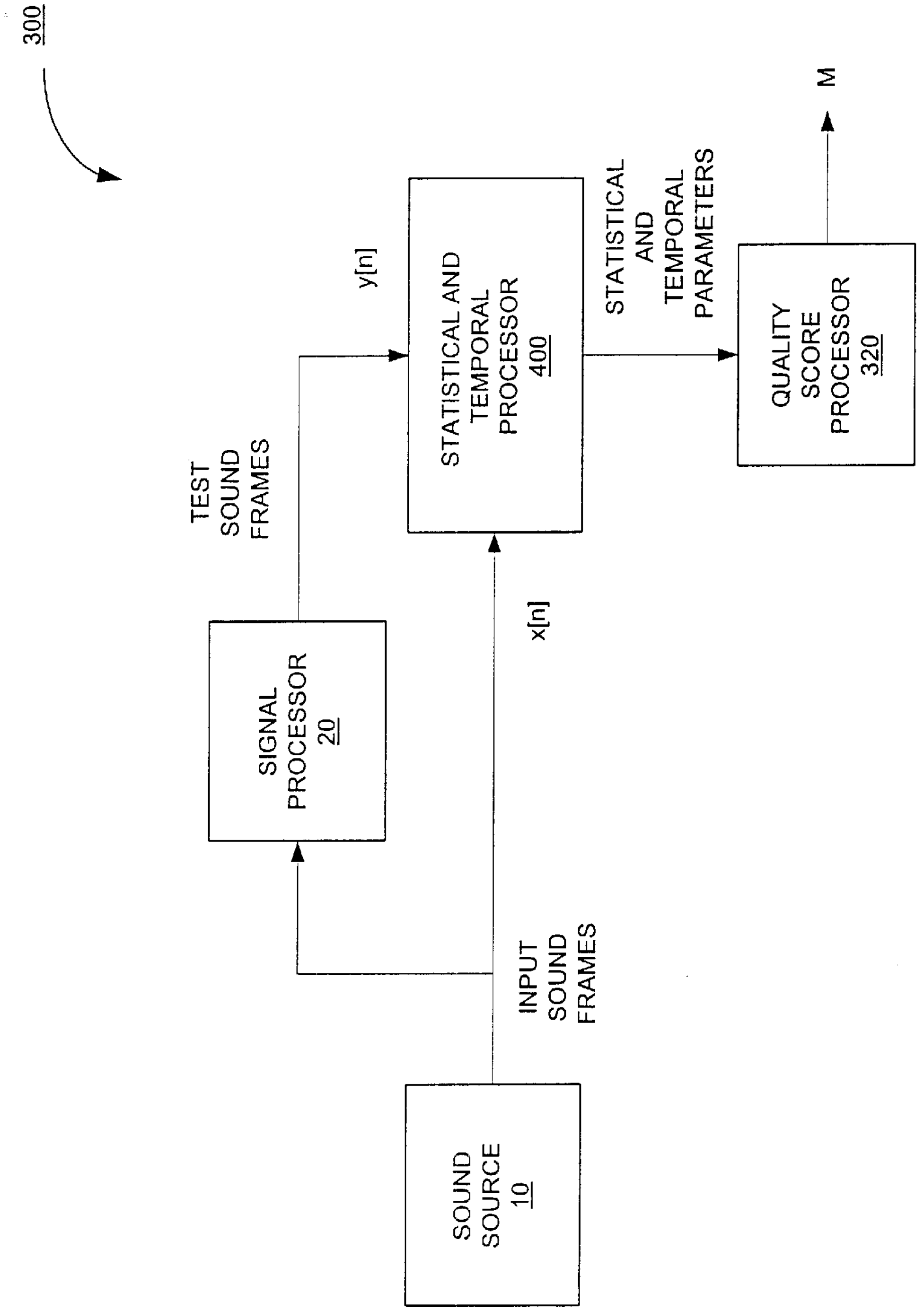
FIG. 3 is a functional block diagram illustrating a prior art sound quality test system according to the present invention.

A test system 300 including a statistical and temporal processor 400 according to the present invention is shown in FIG. 3. Similar to the PSQM system 100 of FIG. 1, sound source 10 generates the series of sound sample frames x[n] which are input to signal processor 20. The signal processor 20 processes the sound sample frames x[n] and outputs the series of coded or test sound frames y[n]. The series of sound sample frames x[n] and the series of test sound frames y[n] are then input to statistical and temporal processor 400 which processes the two series and generates statistical and temporal parameters which evaluate the quality of the coding performed by the signal processor 20. The statistical and temporal parameters produced by statistical and temporal processor 400 are input to quality score processor 320 which combines the parameters to calculate an objective sound quality score M.

The score M can then be used to select a device suitable for sound transmission. For instance, the objective sound quality score values for a number of transmission channels can be analyzed by a selection processor to choose the best transmission channel to carry a voice connection.

The present invention is directed toward a method and apparatus for objectively measuring speech quality over a channel or system whose characteristics vary with time or with input sound. Other objective sound quality measures use a weighted average of "frame based perceptual distortion". The present invention uses statistical and temporal distribution parameters to obtain an improved objective measure.

Figure 1:
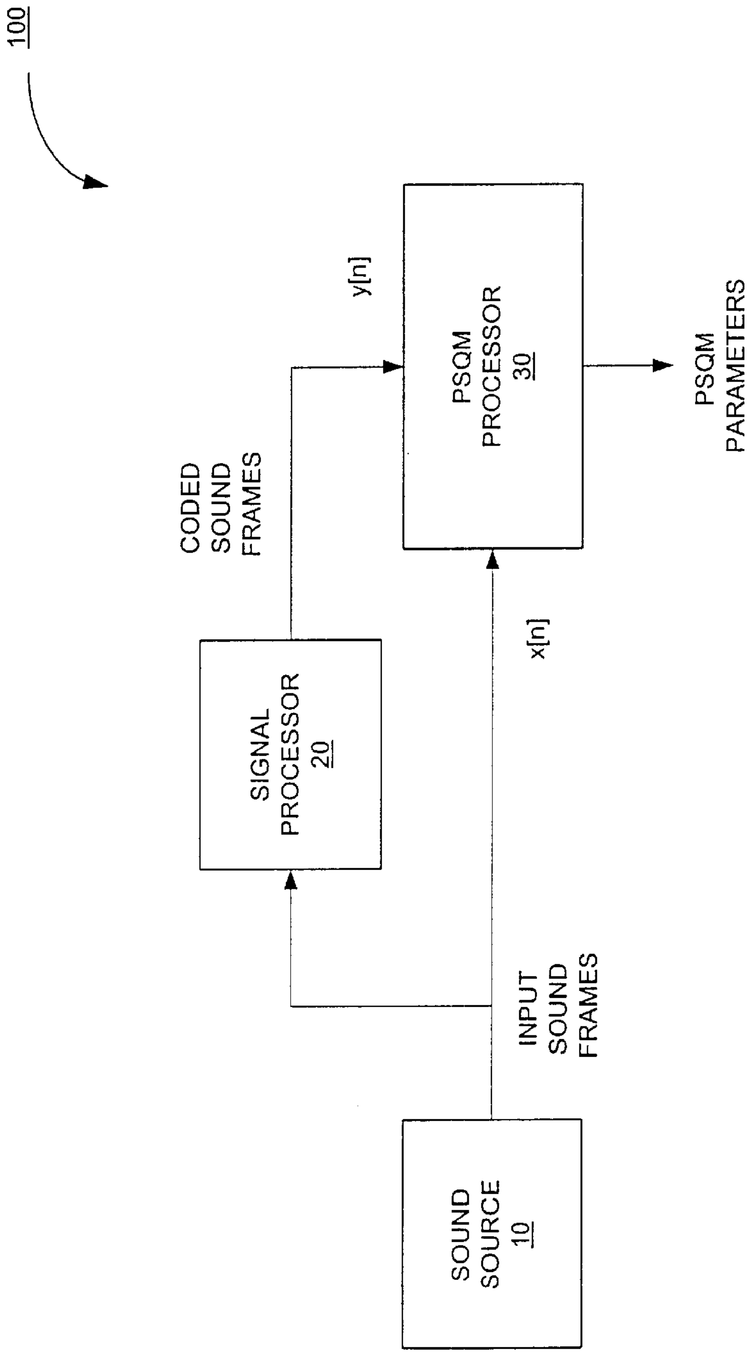
FIGURE 1 (PRIOR ART)
FIG. 1 is a functional block diagram illustrating a conventional sound quality test system.
Figure 2:
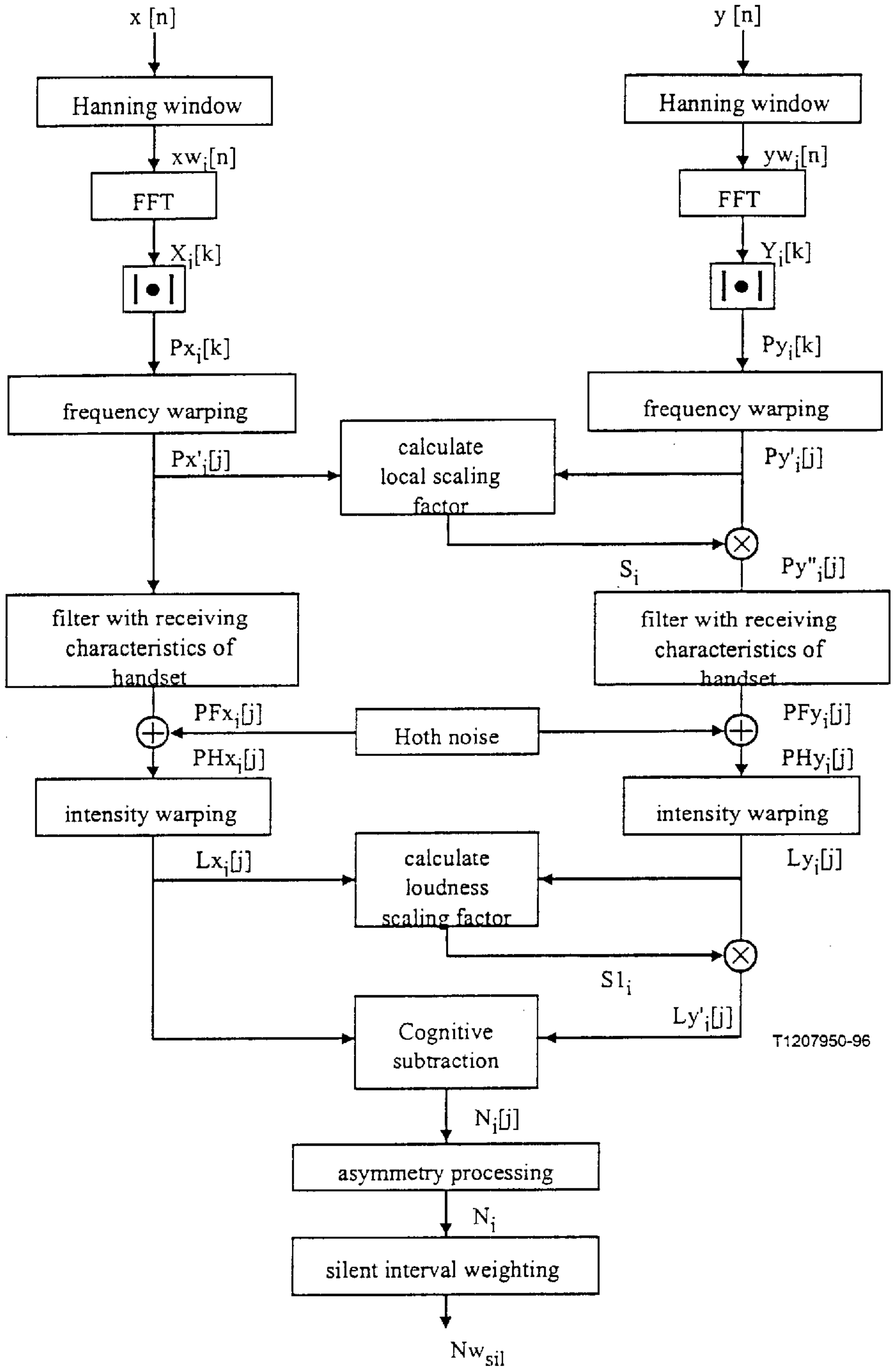
FIGURE 2 (PRIOR ART)
FIG. 2 is a block diagram of a prior art PSQM algorithm performed by the PSQM processor of FIG. 1.

Note that the signal processor 20 of FIGS. 1 and 3 performs a coder/decoder function that can include network or transmission equipment, such as a network channel. The sample sounds are encoded, transmitted over the channel and then decoded to obtain the test sound frames which reflect the conditions present on the channel. Thus, the present invention permits the objective sound quality over a transmission channel, such as a packet network, to be estimated under different network conditions, such as varying network load, jitter, and packet loss rate.

Conventional methods, such as PSQM, typically use an average of frame based perceptually weighted distortion to estimate speech quality. The conventional approach works well for cases in which the channel or system introducing the distortion is reasonably invariant. However, in cases where the distortion varies with time, such as in a channel with frame erasures, the average distortion is not a good indicator of perceived quality.

In cases where the distortion varies, the perceived quality is also dependent upon the statistical and temporal distribution of the distortion. Take the case of a transmission system which uses a high rate voice coder to achieve very low distortion. Even if a few frames are lost, the average distortion remains fairly low even though the perceived quality is poor due to the lost frames.

The present invention uses statistical and temporal analysis of frame based perceptual distortion to compute objective speech quality parameters. The frame based perceptual distortion measure is analyzed to compute the average value as well as the variance and the number of outliers. Here, an outlier is defined as a frame with distortion high enough to be perceptually disruptive. The number of outliers is the number of frames for which the distortion is greater than a predetermined threshold. The percentage of outliers equals:

(the number of outliers)*(100)/(total number of frames).

Temporal analysis is used to find lengths of sequences of frames with high distortion. A long sequence of frames with high distortion is perceptually more disruptive then a single frame with high distortion. A long sequence of outliers can be caused by bursty frame loss in a channel. The distortion threshold used in temporal analysis need not be the same as that used to compute the number of outliers above.

Figure 4:
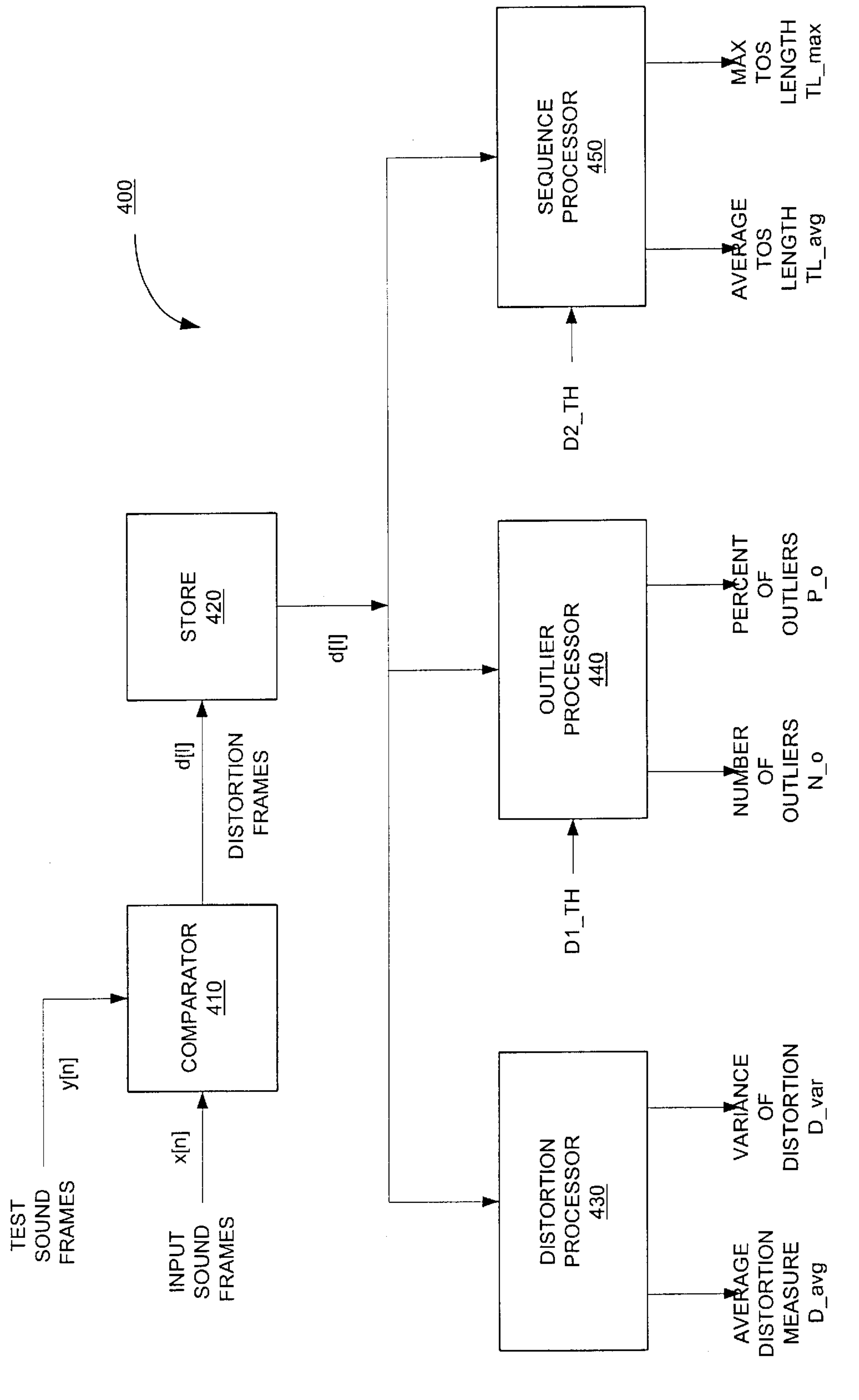
FIG. 4 is a functional block diagram of the statistical and temporal processor of FIG. 3.

FIG. 4 is a block diagram of the statistical and temporal processor 400 of FIG. 3. The series of sound sample frames x[n] and the series of test sound frames y[n] are input to comparator 410 which generates a series of distortion measure frames d[I], I=1 . . . N, where d[I] is the distortion measure between corresponding frames of the sound sample and test sound signals for N frames of each. An example of the comparator 410 is the perceptual technique used in the PSQM algorithm described in ITU-T P.861. The distortion frames d[I] are then stored in store 420 for processing by distortion processor 430, outlier processor 440 and sequence processor 450, which generate statistical and temporal parameters estimating the quality of the test sound frames y[n] produced by signal processor 20.

Distortion processor 430 produces two objective statistical measures of sound quality: an average perceptual distortion measure D_avg and a variance of distortion D_var. The average perceptual-distortion measure D_avg is determined using equation (1) as follows:

$$D\_avg = \frac{1}{N}\sum_{I=1}^{N} d[I] \tag{1}$$

Variance of perceptual distortion measure D_var is a statistical measure of how much the distortion in the test sound frames y[n] varies over the sequence of N frames. D_var is determined by distortion processor 430 according to equation (2) below:

$$D\_var = \frac{1}{N}\sum_{I=1}^{N} d[I]^2 - D\_avg^2 \tag{2}$$

Outlier processor 440 generates two temporal measures of sound quality: a number of outlier frames N_o and a percent of outlier frames P_o. The number of oulier frames N_o is determined by comparing each of the sequence of distortion measures d[I] to predetermined outlier threshold value D1_th. D1_th is selected to be an approximation of the level of distortion which a listener is likely to find annoying, as determined from subjective testing for example. Frames that have greater distortion than D1_th are considered outlier frames.

The total count of outlier frames in the sequence of N frames is N_o. From the number of frames N and the number of outlier frames N_o, the percentage of outlier frames P_o is obtained. These measures reflect the number and percentage, respectively, of frames produced by the signal processor 20 that have a perceptually disruptive level of distortion. The algorithm performed by outlier processor 440 can be described as follows:

```
N_o = 0
for (I = 1  to N){
  if (d[I] > D1_th)N_o = N_o + 1
}
P_o = N_o/N
```

Sequence processor 450 produces two temporal measures of distortion: an average temporal-outlier sequence (TOS) length TL_avg and a maximum temporal-outlier length TL_max. An outlier frame for purposes of TOS length is a frame having distortion greater than temporal outlier distortion threshold D2_th. As noted above, sequences of frames having distortion can be much more disruptive than single frames with a high level of distortion, even if the average level of distortion in the sequence of frames is comparatively much lower. Therefore, D2_th can be selected to be lower than D1_th. The average temporal-outlier sequence (TOS) length TL_avg is determined as follows:

```
Let N_tos = number of temporal-outlier sequences, and T[j] be the
length of the jth TOS.
In_TOS = FALSE
j = 0
for (I = 1 to N){
  if(d[I] > D2_th) {
    If (In_TOS = FALSE) {
      Start a new TOS
      j=j+1
      T[j] = 1
      In_TOS = TRUE
    }
    else T[j] = T[j] + 1
    }
    else In_TOS = FALSE
}
N_tos = j
TL_avg = (1/N_tos) * Sum(T[j])
```

The maximum temporal-outlier sequence length TL_max is then obtained from TL_max=max(T[j]).

Note that the distortion thresholds D1_th and D2_th above can be either fixed or adaptive. For instance, the distortion thresholds can be made to adapt to the amplitude levels of the sample and test signals or the difference in levels between them.

The statistical and temporal parameters described above can be used individually as indicators of the quality of the test sound frames. These parameters can be used as benchmark-reference objective scores to evaluate new releases of sound transmission products, such as network speech or voice products. Also, the parameters are useful during product design to fine tune the parameters of a product or network under design to obtain a desired level of sound quality.

Further, the statistical and temporal parameters described above can also be combined into a weighted objective score M, where M=f(D_avg, D_var, P_o, TL_avg, TL_max). An example function is $M=\alpha*D\_avg+\beta*D\_var+\gamma*P\_o+\delta*TL\_avg+\epsilon*TL\_max$ where $\alpha$, $\beta$, $\gamma$, $\delta$ and $\epsilon$ are constants. These constants can be derived from a variety of sources including psychophysical models and empirical data. The function 'f' can also be non-linear, where $\alpha$, $\beta$, $\gamma$, $\delta$ and $\epsilon$ vary with D_avg.

M can also be mapped onto a subjective scale, where the mapping is determined based on data from subjective tests. This is similar to the PSQM to objective-MOS mapping described in ITIJ-T P.861 section 10.

The weighted objective score M can be used to evaluate network and transmission circuits and systems involved in sound encoding and transmission, such as coder/decoders and transmission channels. For instance, if a variety of transmission channels exist in a network, then each transmission channel can be evaluated using the present invention to determine its suitability for use as a voice channel. Evaluations can also be performed periodically in the network to obtain a voice quality status check on each transmission channel.

Having described and illustrated the principles of the invention in a preferred embodiment thereof, it should be apparent that the invention can be modified in arrangement and detail without departing from such principles. For example, it will be understood by those of ordinary skill in the art that the present invention can be implemented in a variety of contexts including software for execution on a computer, an embedded application on a processor, or an integrated circuit. We claim all modifications and variations coming within the spirit and scope of the following claims.

What is claimed is:

1. A method for evaluating sound quality, the method comprising:

receiving a sequence of source sound frames;

receiving a sequence of test sound frames, corresponding to the sequence of source sound frames;

comparing the sequence of test sound frames to the sequence of source sound frames to obtain a sequence of distortion measure values; and identifying distortion outlier frames in the sequence of distortion measure values greater than a first distortion threshold.

2. The method of claim 1, the method further comprising:

counting the number of distortion outlier frames; and dividing the number of distortion outlier frames by the number of distortion measure values to obtain a percent of distortion outliers value.

3. The method of claim 2, the method further comprising:

identifying as a temporal-outlier sequence each sequence of frames in the sequence of test sound frames having a distortion measure value that is greater than a second distortion threshold; and summing the number of frames in each temporal-outlier sequence and dividing the sum by the number of temporal-outlier sequences to obtain an average temporal-outlier sequence length value.

4. The method of claim 3, the method further comprising:

obtaining a maximum temporal sequence length value by counting the number of frames in the temporal-outlier sequence having the largest number of frames.

5. The method of claim 4, the method further comprising:

summing the distortion measure values for each sequence of test sound frames; and dividing the sum of the distortion measure values by the number of frames in the sequence of test sound frames to obtain an average distortion measure.

6. The method of claim 5, the method further comprising:

squaring the distortion measure value of each one of the sequence of test sound frames;

summing the squared distortion measure values;

dividing the sum of the squared distortion measure values by the number of frames in the sequence of test sound frames to obtain a division result; and subtracting a square of the average distortion measure from the division result to obtain a variance of distortion measure.

7. The method of claim 6, the method further comprising:

utilizing at least one of the percent of distortion outliers value, the average temporal-outlier sequence length value, the maximum temporal sequence length value, the average distortion measure value, and the variance of distortion measure value to generate an objective quality score value.

8. The method of claim 7, the method further comprising:

generating the objective quality score for at least two coder systems; and selecting the coder system having the lowest objective quality score value to transmit a sound signal.

9. A sound quality evaluation processor, the processor comprising:

a comparator having first and second inputs and an output, the first input configured to receive a sequence of sound sample frames and the second input being configured to receive a sequence of test sound frames, where the comparator is configured to compare each frame of the sequence of test sound frames to a corresponding one of the sequence of sound sample frames in order to generate a sequence of distortion measure values at the output of the comparator; and a sequence processor having first and second inputs and a first output, the first input being configured to receive the sequence of distortion measure values from the comparator and the second input being configured to receive a temporal outlier distortion threshold value, where the sequence processor is configured to detect temporal-outlier sequences (TOSs) of the distortion measure values that are greater than the temporal outlier distortion threshold value and compute an average TOS length for output at the first output of the sequence processor.

10. The sound quality evaluation processor of claim 9, wherein the sequence processor further includes a second output and the sequence processor is further configured to detect a maximum ros length of a longest one of the TOSs and output the maximum TOS length at the second output.

11. The sound quality evaluation processor of claim 10, including:

an outlier processor having a first and second inputs and a first output, the first input being configured to receive the sequence of distortion measure values from the comparator and the second input being configured to receive a perceptual outlier distortion threshold value, where the outlier processor is configured to detect each perceptual outlier frame having its distortion measure value being greater than the perceptual outlier distortion threshold value and divide the number of perceptual outlier frames by the number of distortion measure values to obtain a percent of perceptual outliers for output at the first output of the outlier processor.

12. The sound quality evaluation processor of claim 11, wherein the outlier processor is further configured to output the number of perceptual outlier frames at a second output of the outlier processor.

13. The sound quality evaluation processor of claim 12, including:

a distortion processor having an input and a first output, the input being configured to receive the sequence of distortion measure values, where the outlier processor is configured to sum the sequence of distortion measure values and divide the sum by the number of distortion measure values to obtain an average distortion measure for output at the first output of the distortion processor.

14. The sound quality evaluation processor of claim 13, wherein the distortion processor is further configured to compute a variance of the sequence of distortion measure values for output at a second output of the distortion processor.

15. The sound quality evaluation processor of claim 14, where the distortion processor is configured to compute the variance of the sequence of distortion measure values by squaring each of the sequence of distortion measure values, summing the squares, dividing the sum of the squares by the number of distortion measure values, and subtracting a square of the average distortion measure.

16. The sound quality evaluation processor of claim 15, including:

a quality score processor configured to receive at least one of the average TOS length, the maximum TOS length, the percent of perceptual outliers, the number of perceptual outlier frames, the average distortion measure, and the variance of the sequence of distortion measure values and, responsive thereto, generate an objective sound quality score.

17. The sound quality evaluation processor of claim 15, where the quality score processor is further configured to generate the objective sound quality score based upon different weighting for each of the average TOS length, the maximum TOS length, the percent of perceptual outliers, the number of perceptual outlier frames, the average distortion measure, and the variance of the sequence of distortion measure values.

18. A system for evaluating test sound quality, the system comprising:

distortion measuring means for receiving a series of sound sample frames and a series of test sound frames and comparing each test sound frame to a corresponding one of the sound sample frames in order to generate a series of distortion measure values;

temporal analyzing means for detecting sequences of the distortion measure values having distortion values that are greater than a temporal distortion threshold and calculating an average length of the detected sequences and a maximum length of the detected sequences;

scoring means for calculating an objective sound quality score based upon the average length of the detected sequences and the maximum length of the detected sequences.

19. The system of claim 18, further including:

outlier detecting means for detecting outliers of the series of distortion measure values having distortion measure values that are greater than an outlier distortion threshold and calculating a percent of the detected outliers in the series of distortion measure values; and the scoring means is further configured to calculate the objective sound quality score based upon the percent of detected outliers.

20. The system of claim 19, wherein the outlier distortion threshold is greater in magnitude than the temporal distortion threshold.

21. The system of claim 18, further including:

distortion processing means for averaging the series of distortion measure values to obtain an average distortion measure; and the scoring means is further configured to calculate the objective sound quality score based upon the average distortion measure.

22. The system of claim 21, wherein the distortion processing means is further configured to calculate a variance of distortion for the series of distortion measure values, and the scoring means is further configured to calculate the objective sound quality score based upon the variance of distortion.

* * * * *

UNITED STATES PATENT AND TRADEMARK OFFICE

CERTIFICATE OF CORRECTION

PATENT NO. : 6,577,996 B1
DATED : June 10, 2003
INVENTOR(S) : Ramanathan T. Jagadeesan It is certified that error appears in the above-identified patent and that said Letters Patent is hereby corrected as shown below:

Title page,
Item [56], References Cited, U.S. PATENT DOCUMENTS,

| | | |
|---|---|---|
| -- 4,506,358 | 03/1985 | Montgomery |
| 4,757,495 | 07/1988 | Decker et al. -- |

Column 4,
Line 14, “perceptual-distortion” should read -- perceptual distortion --

Column 5,
Line 47, “ITIJ-T” should read -- ITU --

Column 7,
Line 20, “maximum ros” should read -- maximum TOS --.

Signed and Sealed this

Twenty-third Day of December, 2003

JAMES E. ROGAN
*Director of the United States Patent and Trademark Office*